United States Patent [19]

Hill, Jr et al.

[11] 4,429,465
[45] Feb. 7, 1984

[54] APPARATUS FOR MEASURING A BELT CONSTRUCTION AND METHOD OF MAKING SUCH APPARATUS

[75] Inventors: James D. Hill, Jr, Turnback Township, Lawrence County; David L. Alexander, Springfield; Thomas W. Brooks, Nixa, all of Mo.

[73] Assignee: Dayco Corporation, Dayton, Ohio

[21] Appl. No.: 362,722

[22] Filed: Mar. 29, 1982

[51] Int. Cl.³ .............................................. G01B 5/24
[52] U.S. Cl. .................................................. 33/174 E
[58] Field of Search ............ 33/174 E, 174 R, 174 D, 33/148 R, 403

[56] References Cited

U.S. PATENT DOCUMENTS

| | | | |
|---|---|---|---|
| 2,402,015 | 6/1946 | Bowness | 33/174 E |
| 2,702,430 | 2/1955 | Bohnet | 33/174 E |
| 2,874,475 | 2/1959 | McGaffey | 33/174 E |

*Primary Examiner*—Harry N. Haroian
*Attorney, Agent, or Firm*—Joseph V. Tassone

[57] ABSTRACT

An apparatus for measuring the angle of at least one side surface of an endless power transmission belt construction of the V-belt type and a method of making such apparatus are provided, the apparatus having a first part against which the belt construction is adapted to be disposed in a belt construction measuring position thereof and having a second part pivotally mounted to pivot on an axis thereof and being adapted to be pivotally disposed against the one side surface to indicate the angle thereof by the relation of its pivoted position relative to a reference when the belt construction is against the first part in the measuring position thereof. The apparatus has a moving unit operatively interconnected to the second part to tend to move the same toward the belt construction in a direction substantially transverse to the axis thereof when the belt construction is in the measuring position thereof. The second part comprises a plurality of pivotally interconnected links, one of the links having opposed ends with one of those opposed ends being pivotally mounted to the apparatus on the axis thereof and the other of the opposed ends being pivoted to another of the links. The one link is adapted to be pivotally disposed against the one side surface of the belt construction.

26 Claims, 9 Drawing Figures

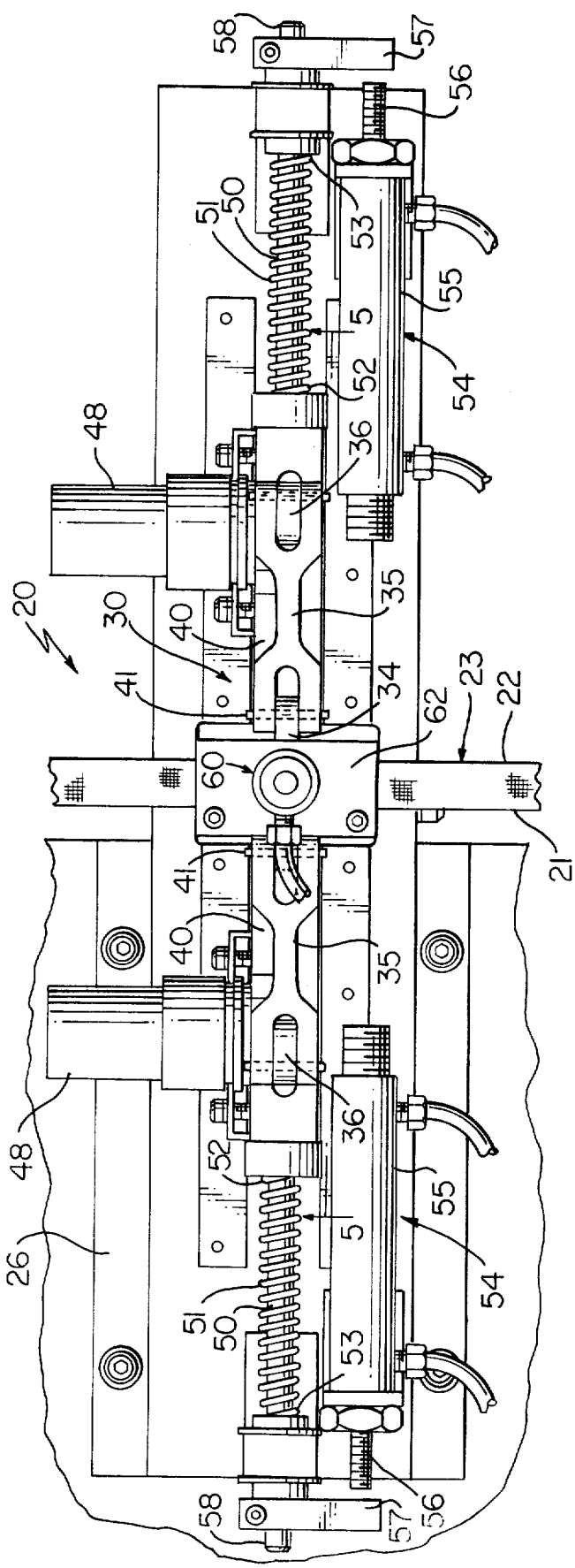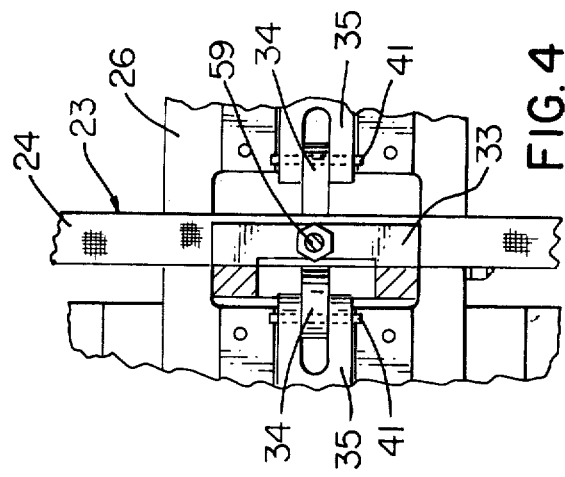

ic page numbers

APPARATUS FOR MEASURING A BELT CONSTRUCTION AND METHOD OF MAKING SUCH APPARATUS

BACKGROUND OF THE INVENTION

1. Field of the Invention

This invention relates to an improved apparatus for measuring the angle of at least one side surface of an endless power transmission belt construction of the V-belt type as well as to a method of making such an apparatus or the like.

2. Prior Art Statement

It is known to provide an apparatus for measuring the angle of at least one side surface of an endless power transmission belt construction of the V-belt type wherein the belt construction has a top surface and a bottom surface with a pair of opposed non-parallel side surfaces therebetween, the apparatus having a first part against which the belt construction is adapted to be disposed in a belt construction measuring position thereof and having a second part pivotally mounted to pivot on an axis thereof and being adapted to be pivotally disposed against the one side surface to indicate the angle thereof by the relation of the pivoted position relative to a reference means when the belt construction is against the first part in the measuring position thereof. The apparatus has moving means operatively interconnected to the second part to tend to move the same toward the belt construction in a direction substantially transverse to the axis thereof when the belt construction is in the measuring position thereof.

For example, see the co-pending patent application Ser. No. 362,212, filed 3/26/82 (Dayco Corporation) of Lee R. Burris et al wherein the second part of the above apparatus comprises a substantially cylindrical member having a chordal surface for engaging against the one side surface of the belt construction.

SUMMARY OF THE INVENTION

It is one feature of this invention to provide an improved apparatus for measuring the angle of at least one side surface of an endless power transmission belt construction of the V-belt type wherein the belt construction has a top surface and a bottom surface with a pair of opposed non-parallel side surfaces therebetween.

In particular, it was found according to the teachings of this invention that the part of the apparatus that is pivotally mounted to pivot about its axis when being disposed against the adjacent side surface of the belt construction being measured and that is made to be movable toward the belt construction in a direction substantially transverse to the pivot axis thereof when the belt construction is at its measuring position in the apparatus, could be formed from a plurality of pivotally interconnected links that could operate an output device in order to provide accurate and repeatable measurements of side surface angles of the belt constructions.

For example, one embodiment of this invention provides an apparatus for measuring the angle of at least one side surface of an endless power transmission belt construction of the V-belt type wherein the belt construction has a top surface and a bottom surface with a pair of opposed non-parallel side surfaces therebetween, the apparatus having a first part against which the belt construction is adapted to be disposed in a belt construction measuring position thereof and having a second part pivotally mounted to pivot on an axis thereof and being adapted to be pivotally disposed against the one side surface to indicate the angle thereof by the relation of its pivoted position relative to a reference means when the belt construction is against the first part in the measuring position thereof. The apparatus has moving means operatively interconnected to the second part to tend to move the same toward the belt construction in a direction substantially transverse to the axis thereof when the belt construction is in the measuring position thereof. The second part comprises a plurality of pivotally interconnected links. One of the links has opposed ends one of which is pivotally mounted to the apparatus on the axis thereof and the other of the opposed ends is pivoted to another of the links. The one link is adapted to be pivotally disposed against the one side surface of the belt construction.

Accordingly, it is an object of this invention to provide an improved apparatus for measuring the angle of at least one side surface of an endless power transmission belt construction of the V-belt type, the apparatus of this invention having one or more of the novel features of this invention as set forth above or hereinafter shown or described.

Another object of this invention is to provide an improved method of making an apparatus for measuring the angle of at least one side surface of an endless power transmission belt construction of the V-belt type, the method of this invention having one or more of the novel features of this invention as set forth above or hereinafter shown or described.

Other objects, uses, and advantages of this invention are apparent from a reading of this description which proceeds with reference to the accompanying drawings forming a part thereof and wherein:

BRIEF DESCRIPTION OF THE DRAWINGS

FIG. 3 is a fragmentary top view of the apparatus of FIG. 1.

FIG. 4 is a fragmentary cross-sectional view taken on line 4—4 of FIG. 1.

DESCRIPTION OF THE PREFERRED EMBODIMENT

Figure 1:
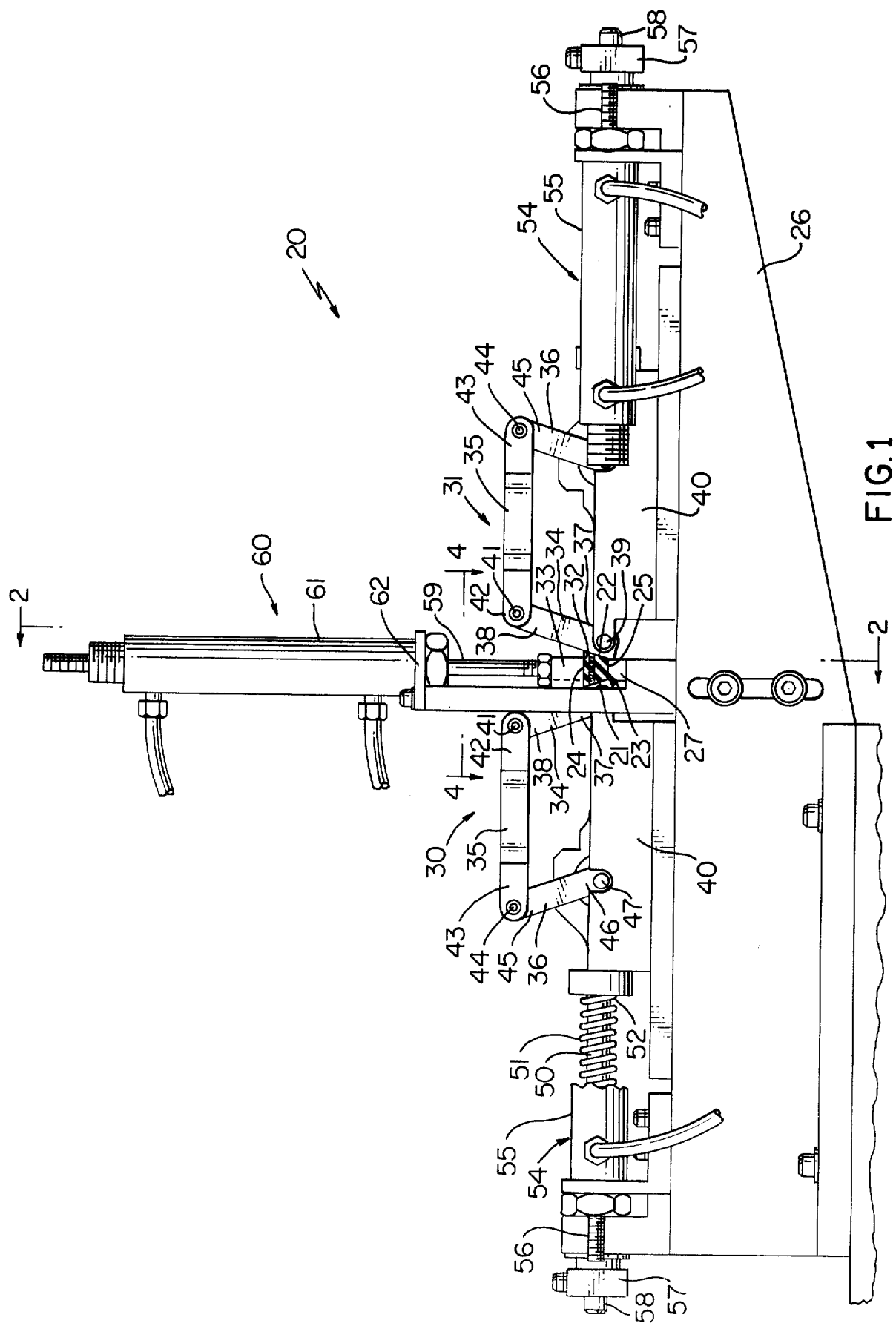
FIG. 1 is a fragmentary side view of the improved apparatus of this invention for measuring the angle of at least one side surface of an endless power transmission belt construction of the V-belt type.

While the various features of this invention are hereinafter set forth as being particularly adapted to provide an apparatus for measuring the angle of at least one side surface of an endless power transmission belt construction of the V-belt type, it is to be understood that the various features of this invention can be utilized singly or in various combinations thereof to provide an apparatus for measuring the angle of other structure as desired.

Therefore, this invention is not to be limited to only the embodiment illustrated in the drawings, because the drawings are merely utilized to illustrate one of the wide variety of uses of this invention.

Referring now to FIGS. 1–4, the improved apparatus of this invention for measuring the angle of at least one side surface of an endless power transmission belt construction of a V-belt type is generally indicated by the reference numeral 20 and is illustrated as measuring the angles of the opposed side surfaces 21 and 22 of an endless power transmission belt construction 23 of a V-belt type wherein the belt construction 23 has a top surface 24 and a bottom surface 25 with the pair of opposed non-parallel side surfaces 21 and 22 disposed therebetween whereby the belt construction 23 has a generally trapezoidal cross-sectional configuration as is conventional in the art.

Figure 2:
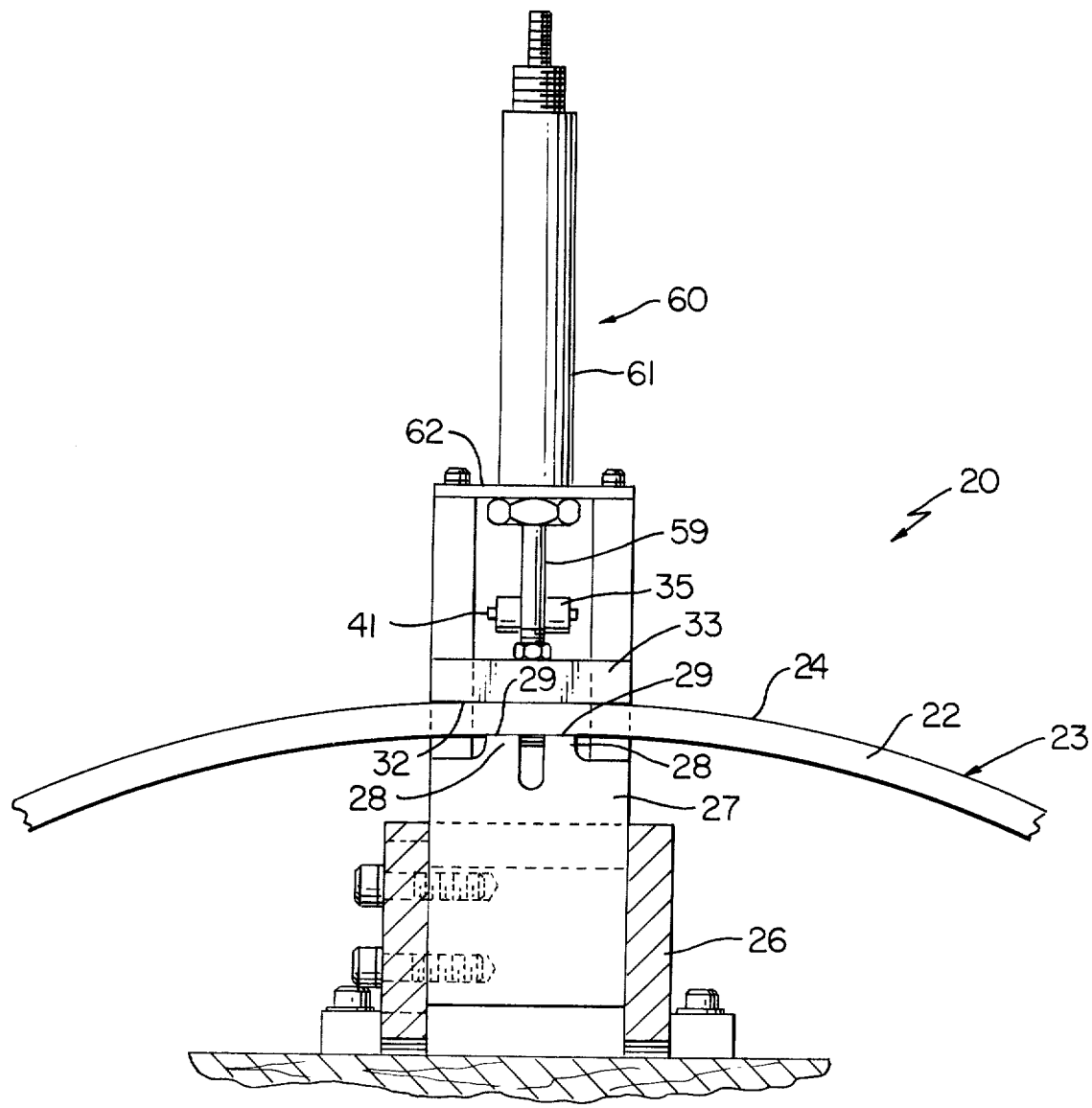
FIG. 2 is a fragmentary cross-sectional view taken on line 2—2 of FIG. 1.

The apparatus 20 comprises a frame means 26 having a first part 27 against which the bottom surface 25 of the belt construction 23 is adapted to be disposed, the first part 27 comprising a pair of spaced parallel rail-like members 28 that are illustrated in FIG. 2 as having substantially flat top surfaces 29 so as to substantially conform to the arcuate contour of the bottom surface 25 of the belt construction 23 when the belt construction 23 is disposed in its natural annular configuration as partially illustrated in FIG. 2 and is disposed in the apparatus in a manner hereinafter set forth.

The apparatus 20 has a second part that is generally indicated by the reference numeral 30 and a third part that is generally indicated by the reference numeral 31 and is substantially identical to the second part 30, the parts 30 and 31 being adapted to respectively measure the angles of the side surfaces 21 and 22 of the belt construction 23 when the belt construction 23 is disposed in a belt measuring position thereof in the apparatus 20 wherein the belt construction 23 has its bottom surface 25 disposed against the surfaces 29 of the rail-like members 28, is transverse to the rail-like members 28 and is disposed directly beneath a bottom holding surface 32 of a moving holding member 33 that engages against the top surface 24 of the belt construction 23 as illustrated in FIGS. 1, 2, 5, 8 and 9 and holds the bottom surface 25 of the belt construction 23 against the rail-like members 28.

The parts 30 and 31 of the apparatus 20 each comprises a set of a plurality of pivotally interconnected links 34, 35 and 36, one link 34 of each set having opposed ends 37 and 38 with the end 37 being pivotally interconnected by a pivot pin 39 to a movable block 40 of the apparatus 20 and the other end 38 being pivotally interconnected by a pivot pin 41 to the end 42 of the link 35 of its respective set. The link 35 of the part 30 or 31 has its other end 42 pivotally interconnected by a pivot pin 44 to the end 45 of the link 36 of the set thereof, the other end 46 of the link 36 being secured to a rotatable input member 47 of an electrical signal generating output device 48 carried by the respective block 40 of the apparatus 20 for a purpose hereinafter described.

Figure 5:
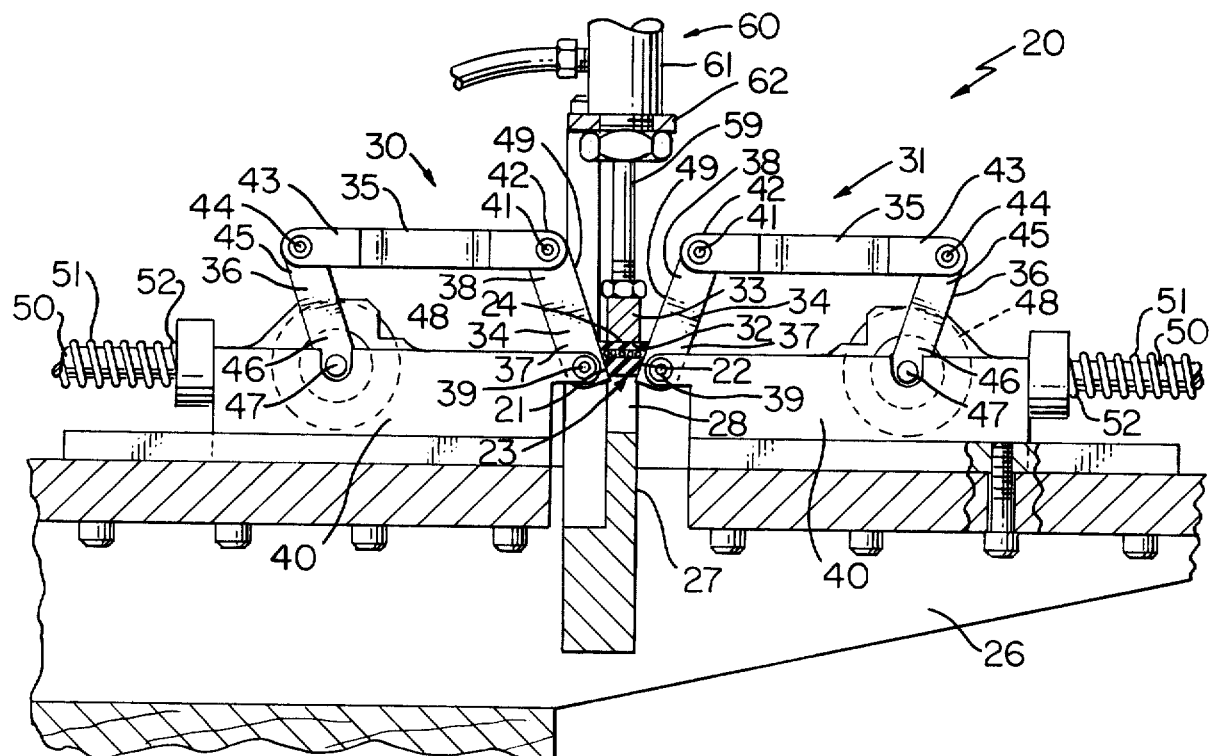
FIG. 5 is a fragmentary cross-sectional view taken on line 5—5 of FIG. 3.

The link 34 of the part 30 of the apparatus 20 has a straight edge or surface 49 adapted to be pivoted against the entire side surface 21 of the belt construction 23 when the belt construction 23 is disposed in the belt construction measuring position illustrated in FIG. 5 whereby the pivotally interconnected links 34, 35 and 36 of the part 30 effectively rotate the input member 47 of its interconnected signal generating output device 48 to a position thereof that produces an electrical signal from the device 48 that corresponds to the pivoted position of the link 34. Similarly, the link 34 of the part 31 of the apparatus 20 has a straight edge or surface 49 for being pivoted against the entire length of the side surface 22 of the belt construction 23 so that its output device 48 will likewise produce an electrical signal that corresponds to the pivoted position of the link 34 of the part 31 as will be apparent hereinafter.

Each block 40 is adapted to slide on the frame means 26 in a generally horizontal direction that is substantially transverse to the pivot axis of the pivot pin 39 of the respective part 30 or 31 thereof, each block 40 being secured to a rod 50 movably carried by the frame means 26 and being urged toward the belt construction 23 when the belt construction 23 is disposed in the belt measuring position thereof as illustrated in the drawings by a compression spring 51 telescoped on the rod 50 having one end 52 bearing against the respective block 40 and the other end 53 bearing against the frame means 26 as illustrated.

Figure 6:
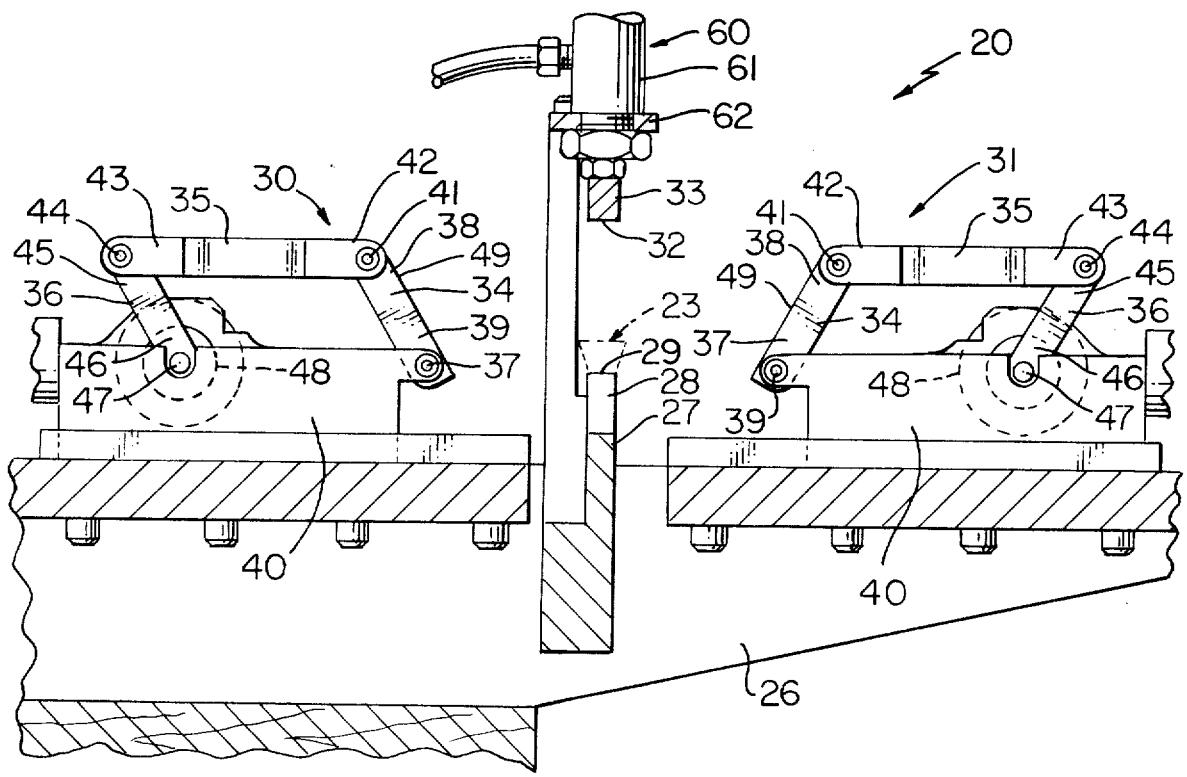
FIG. 6 is a view similar to FIG. 5 and illustrates the apparatus in its open condition.

In order to move the blocks 40 transversely away from the belt construction 23 when the belt construction 23 is disposed in the belt measuring position, as illustrated by the blocks 40 having been moved from the closed position illustrated in FIG. 5 to the open position illustrated in FIG. 6, a piston and cylinder device that is generally indicated by the reference numeral 54 in the drawings is provided for each block 40 and has its cylinder 55 secured to the frame means 26 and its piston 56 adapted to abut against a flange-like member 57 carried by the end 58 of the respective rod 50 for its respective block 40. In this manner, when the piston and cylinder devices 54 are operated to extend the piston rods 56 thereof, the piston rods 56 will engage against the flanges 57 and carry rods 50 therewith and thereby pull the blocks 40 in opposition to the force of the compression springs 51 transversely away from each other as illustrated in FIG. 6. However, when the flow of fluid pressure being directed to the piston and cylinder devices 54 is terminated, the force of the compression springs 51 is sufficient to move the blocks 40 toward each other from the open position illustrated in FIG. 6 to the closed position illustrated in FIG. 7 as will be apparent hereinafter.

Figure 8:
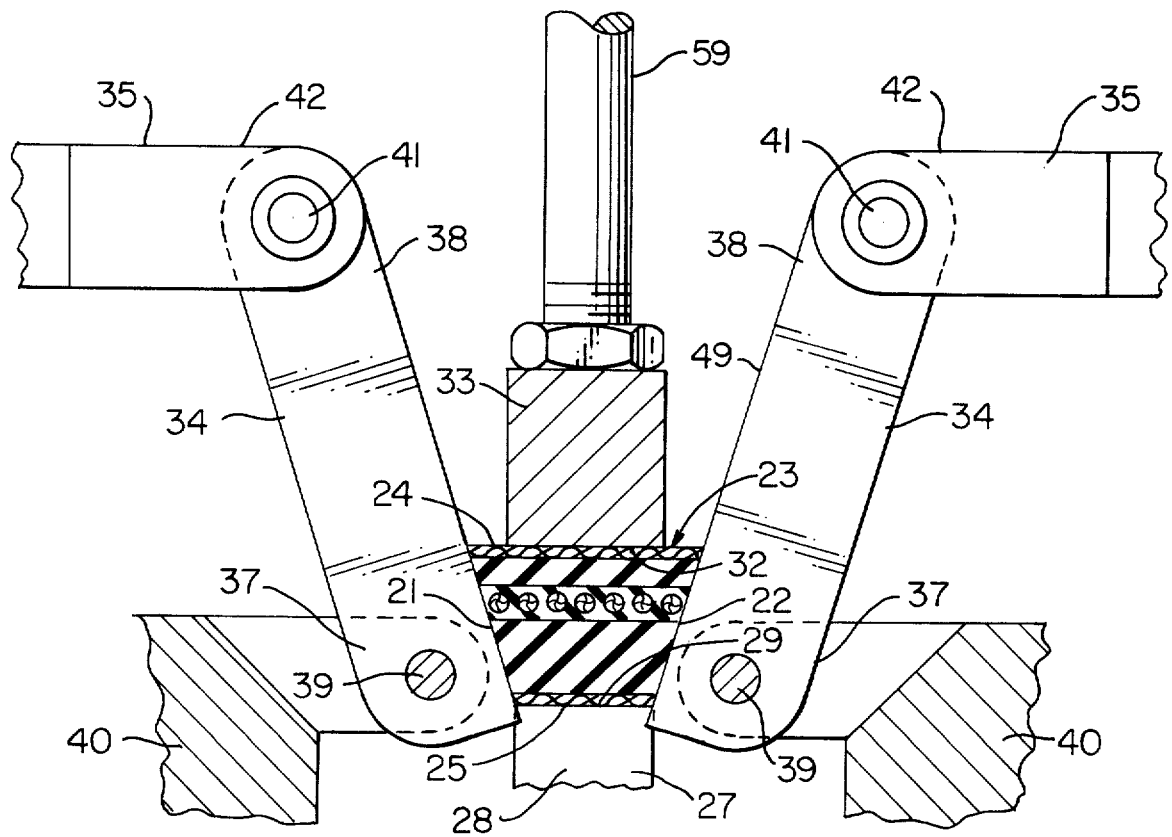
FIG. 8 is a view similar to FIG. 7 and illustrates the belt construction in the belt construction measuring position thereof.

The holding member 33 is carried by a piston 59 of a piston and cylinder device that is generally indicated by the reference numeral 60 in the drawings and has its cylinder 61 secured to a bracket 62 of the frame means 26 so as to position the holding member 33 directly above the rail-like members 28 of the first part 27 of the apparatus 20 whereby actuation of the piston and cylinder device 60 can move the holding member 33 downwardly toward the rails 28 to hold the bottom surface 25 of the belt construction 23 against the surfaces 29 of the rails 28 as illustrated in FIGS. 2, 5 and 8 or can move the holding member 33 vertically upwardly as illustrated in FIG. 6 so as to permit the removal of a measured belt construction 23 and the subsequent insertion of a new belt construction 23 into the apparatus 20 to be measured thereby as will be apparent hereinafter.

While the output devices 48 can be utilized in any suitable manner to display the electrical output signals being produced thereby in a manner well known in the art, the devices 48 can each comprise an analog device known as a rotary variable differential transformer (RVDT) and can be utilized in any suitable manner to provide a readout of the electrical signals produced thereby as determined by the pivoted positions of the links 34 of the parts 30 and 31 when utilized in a manner hereinafter set forth.

In fact the output devices 48 could merely comprise mechanical indicating means similar to the arm and scale visual indicating means set forth in the aforementioned co-pending patent application which is being incorporated into this application by this reference thereto whereby it is to be understood that the links 36 of the parts 30 and 31 could move relative to stationary scales carried by the respective blocks 40 to indicate the angles being measured by the links 34 as set forth in such co-pending patent application.

Therefore, it can be seen that the apparatus 20 of this invention can be made from a relatively few parts in a relatively simple manner by the method of this invention to operate in a manner now to be described.

Figure 7:
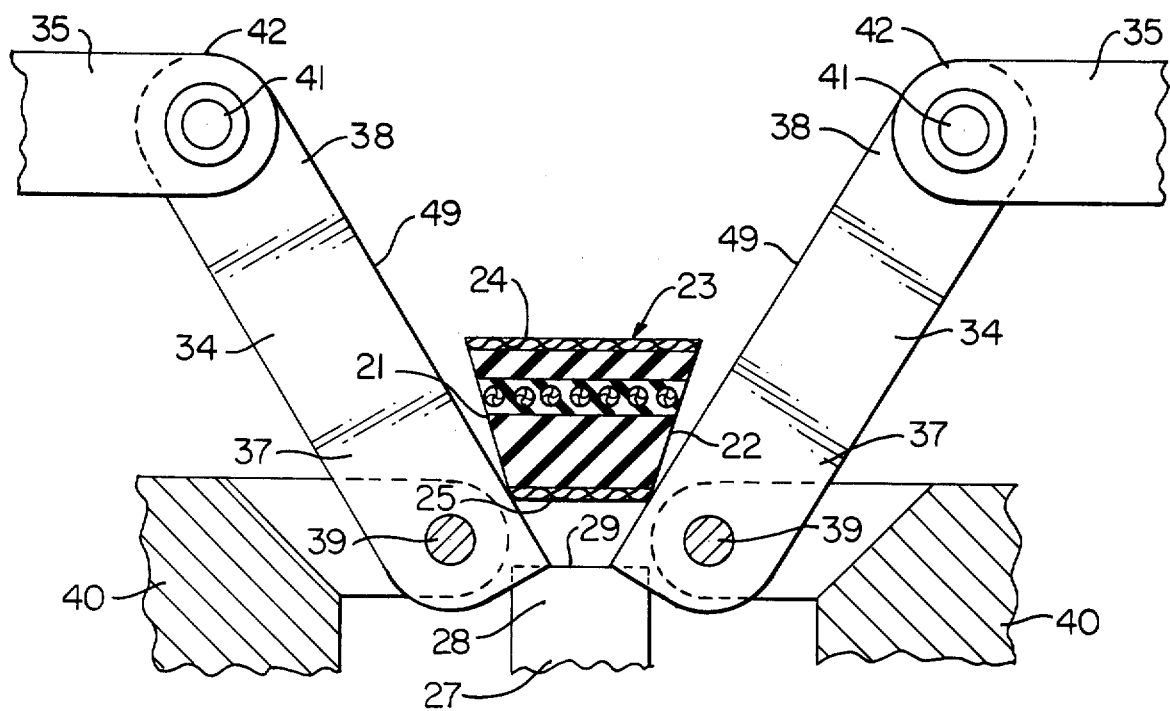
FIG. 7 is an enlarged view of the belt measuring portion of FIG. 5 before the inserted belt construction has been moved to the belt measuring position thereof.

When it is desired to measure the angles of the side surfaces 21 and 22 of a belt construction 23 with the apparatus 20 of this invention, the piston and cylinder device 60 is actuated to raise the holding member 33 to the position illustrated in FIG. 6. However, the piston and cylinder devices 54 are placed in such a condition that the same have their pistons 56 fully retracted so that the compression springs 51 have moved the parts 30 and 31 inwardly toward each other in a direction transverse to the pivot axes 39 of the links 34 whereby the links 34 are disposed closely adjacent each other as illustrated in FIG. 7. Thereafter, the belt construction 23, in its annular loop form, is slipped over the right hand end of the frame 26 as illustrated in FIG. 1 to be passed over the part 31 and be dropped down between the parts 30 and 31 with its bottom surface 25 having the opposed corners thereof engaging against the surfaces 49 of the links 34 of the parts 30 and 31 as illustrated in FIG. 7. In this manner, the bottom surface 25 of the belt construction 23 is held spaced above the top surfaces 29 of the rails 28 by the links 34 under the force of the compression springs 51 as illustrated in FIG. 7.

At this time, the piston and cylinder device 60 is operated to cause the piston 59 thereof to move the holding member 33 downwardly and cause the end 32 thereof to compress against the top surface 24 of the belt construction 23 and force the same downwardly between the links 34 which now pivot on their axes 39 to tend to conform to the angles of the side surfaces 21 and 22 as well as have the parts 30 and 31 move transversely away from each other in opposition to the force of the compression springs 51 to permit the belt construction 23 to be wedged therebetween in a manner to place the bottom surface 25 of the belt construction 23 against the top surfaces 29 of the rail-like members 28 as illustrated in FIG. 8, as well as in FIGS. 1 and 5.

It can be seen that when the belt construction 23 has been fully disposed in the belt measuring position thereof wherein the bottom surface 25 thereof is resting against the top surfaces 29 of the rail-like members 28, the links 34 of the parts 30 and 31 have the edges 49 thereof fully disposed against the side surfaces 21 and 22 of the belt construction 23 throughout the entire length thereof so that the links 36 of the parts 30 and 31 have rotated the input shafts 47 of the devices 48 to positions to correspond to the pivoted positions of the links 34 whereby the output devices 48 are now producing output signals that correspond respectively to the exact pivoted positions of the links 34.

The output signals of the devices 48 can be utilized in any suitable manner to provide a readout, visual or printed, that indicates the exact angles that the side surfaces 21 and 22 make relative to a reference means, such as a true vertical line or a true horizontal line as the case may be. Alternately, the links 36 of the parts 30 and 31 can act as indicating arms that indicate against stationary scales carried by the blocks 40 the exact angles being measured by the links 34 as set forth in the aforementioned co-pending patent application.

In any event, when the belt construction 23 is being measured in the above manner, the operator of the apparatus 20 can determine the exact angles of the side surfaces 21 and 22 of the belt construction 23 in order to make sure that the same conform to the desired angles for a production run of belt constructions 23 as is well known in the belt making art.

After the belt construction 23 has been measured in the above manner, the measured belt constructions 23 is adapted to be removed from the apparatus 20 by having the piston and cylinder device 60 operated to raise the holding member 33 away from the belt construction 23 as illustrated in FIG. 6. Also, the piston and cylinder devices 54 are operated to extend the pistons 56 thereof and thereby move the blocks 40 transversely outwardly from the measured belt construction 23 in opposition to the force of the compression springs 51 as illustrated in FIG. 6 so that the belt construction 23 can be readily removed from the apparatus 20 by slipping the same off of the right hand end of the frame 26.

In this manner, the apparatus 20 is now ready to measure another belt construction 23 in the manner previously described.

Figure 9:
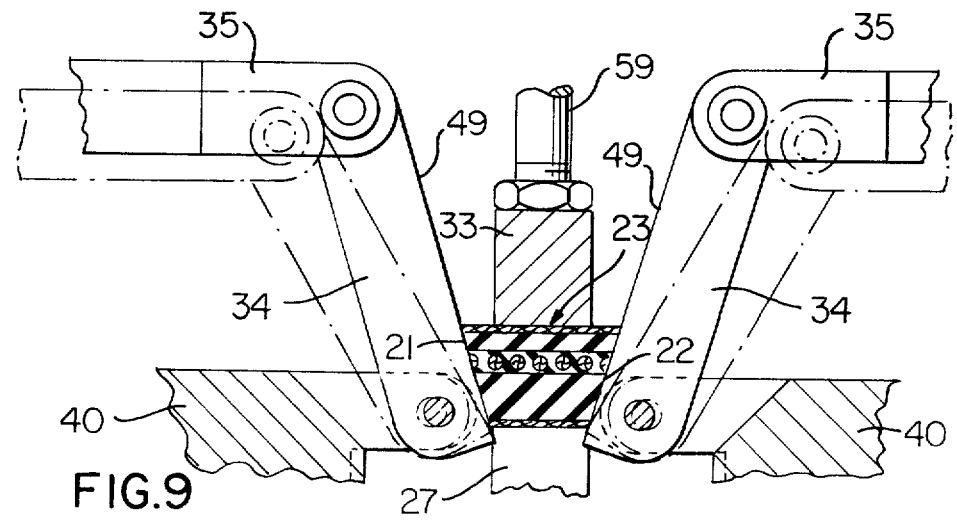
FIG. 9 is a view similar to FIGS. 7 and 8 and illustrates another manner of utilizing the apparatus of FIG. 1 to measure a belt construction.

While the operation of the apparatus 20 has been previously described as having the belt construction 23 forced between the links 34 in order to place the bottom surface 25 thereof against the top surfaces 29 of the rail-like members 28, it is to be understood that the apparatus 20 could be operated by first maintaining the blocks 40 in their out or open position as illustrated in FIG. 6 so that the belt construction 23 can be initially disposed in the apparatus 20 with its bottom surface 25 against the top surfaces 29 of the rail-like members 28 and be held thereagainst by the holding member 33 being moved downwardly against the top surface 25 as illustrated in FIG. 9. Thereafter, the piston and cylinder devices 54 could be operated to retract the pistons 56 thereof so that the force of the compression springs 51 will move the parts 30 and 31 transversely toward the belt construction 23 whereby the links 34 will be pivoted against the side surfaces 21 and 22 as illustrated in FIG. 9 from their dash-dotted positions to their full line positions as illustrated in FIG. 9 to measure the angles thereof through the linkage means 30 and 31 in the manner previously described.

In any event, it can be seen that the pivot points 39 of the links 34 are disposed somewhat closely adjacent the bottom surface 25 of the belt construction 23 when the belt construction 23 is in the belt measuring position thereof. However, the pivot points 39 are still disposed intermediate the top and bottom surfaces 24 and 25 of the belt construction 23 in order to provide accurate measurements of the angles of the side surfaces 21 and 22 as previously described.

Therefore, it can be seen that this invention not only provides an improved apparatus for measuring the angle of at least one side surface of an endless power transmission belt construction of the V-belt type, but also this invention provides a method of making such an apparatus.

While the form and method of this invention now preferred have been illustrated and described as required by the Patent Statute, it is to be understood that other forms and method steps can be utilized and still fall within the scope of the appended claims.

What is claimed is:

1. In an apparatus for measuring the angle of at least one side surface of an endless power transmission belt construction of the V-belt type wherein said belt construction has a top surface and a bottom surface with a pair of opposed non-parallel side surfaces therebetween, said apparatus having a first part against which said belt construction is adapted to be disposed in a belt construction measuring position thereof and having a second part pivotally mounted to pivot on an axis thereof and being adapted to be pivotally disposed against said one side surface to indicate the angle thereof by the relation of its pivoted position relative to a reference means when said belt construction is against said first part in said measuring position thereof, said apparatus having moving means operatively interconnected to said second part to tend to move the same toward said belt construction in a direction substantially transverse to said axis thereof when said belt construction is in said measuring position thereof the improvement wherein said apparatus has an angle indicating output device having a rotatable input member and wherein said second part comprises a plurality of pivotally interconnected links, one of said links having opposed ends, one of said opposed ends of said one link being pivotally mounted to said apparatus on said axis and the other of said opposed ends of said one link being pivotally mounted to said apparatus on said axis and the other of said opposed ends being pivoted to another of said links, said one link being adapted to be pivotally disposed against said one side surface of said belt construction, said links being interconnected to said angle indicating output device through said rotatable input member to operate said output device in relation to the pivoted position of said one link, and wherein said other link is pivotally interconnected to a third link of said plurality of links, said third link being secured to said input member of said device.

2. An apparatus as set forth in claim 1 wherein said apparatus has a block movable thereon in said transverse direction, said one link having said one end pivotally mounted to said block, said output device being carried by said block.

3. An apparatus as set forth in claim 1 wherein said moving means comprises a biasing means.

4. An apparatus as set forth in claim 3 wherein said biasing means comprises a compression spring.

5. An apparatus as set forth in claim 1 and including a movable holding member for holding said belt construction in said measuring position thereof.

6. An apparatus as set forth in claim 5 wherein said holding member is adapted to engage said belt construction to hold said belt construction in said measuring position thereof.

7. An apparatus as set forth in claim 6 and including means operatively interconnected to said holding means for tending to move said holding member in a direction toward said belt construction when said belt construction is in said measuring position thereof.

8. An apparatus as set forth in claim 7 wherein said means for tending to move holding member comprises a piston and cylinder device.

9. An apparatus as set forth in claim 1 wherein said apparatus has a frame means, said first part being carried by said frame means and comprising a pair of spaced parallel rail-like members.

10. An apparatus as set forth in claim 9 and including a movable holding member for holding said belt construction with its said bottom surface against said rail-like members and with said belt construction transverse to said rail-like members.

11. An apparatus as set forth in claim 10 wherein said holding member is adapted to engage said top surface of said belt construction to hold said belt construction in said belt construction measuring position thereof.

12. An apparatus as set forth in claim 1 and including a third part pivotally mounted to pivot on an axis thereof and being adapted to be pivotally disposed against the other side surface of said belt construction when said belt construction is in said measuring position thereof to indicate the angle thereof by the relation of its pivoted position relative to a reference means, said apparatus having moving means operatively interconnected to said third part to tend to move the same toward said belt construction in a direction substantially transverse to said axis thereof when said belt construction is in said measuring position thereof, said third part comprising a second set of a plurality of pivotally interconnected links, one of said links of said second set having opposed ends, one of said opposed ends of said one link of said second set being pivotally mounted to said apparatus on said axis and the other of said opposed ends being pivoted to another of said links of said second set, said one link of said second set being adapted to be pivotally disposed against said other side surface of said belt construction.

13. An apparatus as set forth in claim 12 wherein said moving means for said second part and said third part each comprises a compression spring whereby said springs urge said second and third parts toward each other, said apparatus having means for forcing said belt construction between said second and third parts to hold said belt construction against said first part whereby said belt construction in said measuring position thereof moves said second and third parts transversely away from said belt construction and causes said second and third parts to pivot on said axes thereof to conform respectively to said side surfaces thereof and thereby indicate the angles thereof.

14. In a method of making an apparatus for measuring the angle of at least one side surface of an endless power transmission belt construction of the V-belt type wherein said belt construction has a top surface and a bottom surface with a pair of opposed non-parallel side surfaces therebetween, said method comprising the steps of forming a first part of said apparatus against which said belt construction is adapted to be disposed in a belt construction measuring position thereof and be adapted to be pivotally disposed against said one side surface to indicate the angle thereof by the relation of its pivoted position relative to a reference means when said belt construction is against said first part in said measuring position thereof, and operatively interconnecting moving means to said construction is against said first part in said measuring position thereof, and operatively interconnecting moving means to said second part to tend to move the same toward said belt construction in a direction substantially transverse to said axis thereof when said belt construction is in said measuring position thereof, the improvement comprising the steps of forming said second part to comprise a plurality of pivotally interconnected links, forming one of said links to have opposed ends, pivotally mounting one of said opposed ends of said one link to said apparatus on said axis and the other of said one link to said apparatus on said axis and the other of said opposed ends to another of said links, forming said one link to be adapted to be pivotally disposed against said one side surface of said belt construction, forming said apparatus to include an angle indicating output device, and interconnecting said links to said output device to operate said output device in relation to the pivoted position of said one link, forming said device to have a rotatable input member, and interconnecting said links to said input member to rotate said input member in relation to the pivoted position of said one link, pivotally interconnecting said other link to a third link of said plurality of links, and securing said third link to said input member of said device.

15. A method as set forth in claim 14 and including the steps of forming said apparatus to include a block movable thereon in said transverse direction, pivotally mounting said one end of said one link to said block, and causing said output device to be carried by said block.

16. A method as set forth in claim 14 and including the step of forming said moving means to comprise a biasing means.

17. A method as set forth in claim 16 and including the step of forming said biasing means to comprise a compression spring.

18. A method as set forth in claim 14 and including the step of disposing a movable holding member on said apparatus for holding said belt construction in said measuring position thereof.

19. A method as set forth in claim 18 and including the step of forming said holding member to be adapted to engage said belt construction to hold said belt construction in said measuring position thereof.

20. A method as set forth in claim 19 and including the step of operatively interconnecting means to said holding means to tend to move said holding member in a direction toward said belt construction when said belt construction is in said measuring position thereof.

21. A method as set forth in claim 20 and including the step of forming said means for tending to move said holding member to comprise a piston and cylinder device.

22. A method as set forth in claim 14 and including the steps of forming said apparatus to have a frame means, and forming said first part to be carried by said frame means and comprise a pair of spaced parallel rail-like members.

23. A method as set forth in claim 22 and including the step of forming a movable holding member for holding said belt construction with its said bottom surface against said rail-like members and with said belt construction transverse to said rail-like members.

24. A method as set forth in claim 23 and including the step of forming said holding member to be adapted to engage said top surface of said belt construction to hold said belt construction in said belt construction measuring position thereof.

25. A method as set forth in claim 1 and including the steps of pivotally mounting a third part on said apparatus to pivot on an axis thereof and be adapted to be pivotally disposed against the other side surface of said belt construction when said belt construction is in said measuring position thereof to indicate the angle thereof by the relation of its pivoted position relative to a reference means, operatively interconnecting moving means to said third part to tend to move the same toward said belt construction in a direction substantially transverse to said axis thereof when said belt construction is in said measuring position thereof, forming said third part to comprise a second set of a plurality of pivotally interconnected links, forming one of said links of said second set to have opposed ends, pivotally mounting one of said opposed ends of said one link of said second set to said apparatus on said axis and the other of said opposed ends to another of said links of said second set, and forming said one link of said second set to be adapted to be pivotally disposed against said other side surface of said belt construction.

26. A method as set forth in claim 25 and including the steps of forming said moving means for said second part and said third part to each comprise a compression spring whereby said springs urge said second and third parts toward each other, and forming means on said apparatus for forcing said belt construction between said second and third parts to hold said belt construction against said first part whereby said belt construction in said measuring position thereof will move said second and third parts transversely away from said belt construction and cause said second and third parts to pivot on said axes thereof to conform respectively to said side surfaces thereof and thereby indicate the angles thereof.

* * * * *